(12) United States Patent
Xie et al.

(10) Patent No.: US 11,306,186 B2
(45) Date of Patent: Apr. 19, 2022

(54) METHOD FOR PREPARING INTELLIGENT ANTIBACTERIAL AND ANTIOXIDATIVE FILM

(71) Applicant: Shanghai Ocean University, Shanghai (CN)

(72) Inventors: Jing Xie, Shanghai (CN); Zhipeng Tang, Shanghai (CN); Chenwei Chen, Shanghai (CN); Jinfeng Wang, Shanghai (CN); Yuhan Zhang, Shanghai (CN)

(73) Assignee: Shanghai Ocean University, Shanghai (CN)

( * ) Notice: Subject to any disclaimer, the term of this patent is extended or adjusted under 35 U.S.C. 154(b) by 913 days.

(21) Appl. No.: 16/104,955

(22) Filed: Aug. 20, 2018

(65) Prior Publication Data

US 2018/0355131 A1    Dec. 13, 2018

Related U.S. Application Data

(63) Continuation of application No. PCT/CN2017/009319, filed on Jul. 17, 2017.

(30) Foreign Application Priority Data

May 2, 2017    (CN) .......................... 201710301118.1

(51) Int. Cl.
| | | |
|---|---|---|
| *C08J 5/18* | (2006.01) | |
| *A01N 25/10* | (2006.01) | |
| *A01N 59/16* | (2006.01) | |
| *C08K 3/22* | (2006.01) | |
| *C08K 5/1545* | (2006.01) | |
| *B29C 41/00* | (2006.01) | |
| *C08J 3/21* | (2006.01) | |
| *B29K 509/02* | (2006.01) | |
| *B29K 29/00* | (2006.01) | |
| *B29K 105/16* | (2006.01) | |

(52) U.S. Cl.
CPC ................ *C08J 5/18* (2013.01); *A01N 25/10* (2013.01); *A01N 59/16* (2013.01); *B29C 41/003* (2013.01); *C08J 3/212* (2013.01); *C08K 3/22* (2013.01); *C08K 5/1545* (2013.01); *B29K 2029/04* (2013.01); *B29K 2105/162* (2013.01); *B29K 2509/02* (2013.01); *C08J 2329/04* (2013.01); *C08K 2003/2241* (2013.01); *C08K 2201/005* (2013.01); *C08K 2201/011* (2013.01)

(58) Field of Classification Search
CPC .................................. C08J 5/18; C08K 5/1545
See application file for complete search history.

*Primary Examiner* — Alex A Rolland

(57) ABSTRACT

A method for preparing an intelligent antibacterial and antioxidative film involves preparing a PVA solution; adding nano-$TiO_2$ to the PVA solution to obtain a PVA-$TiO_2$ solution; determining the optimal amount of nano-$TiO_2$; preparing a PSPC solution; preparing a PSPC-$TiO_2$-PVA solution; and producing a PSPC/$TiO_2$/PVA film. The film has better mechanical performance than saccharide and protein films. Shelf life of food is prolonged as the film possesses antibacterial and antioxidative properties. Furthermore, the film shows different colors in various pH environments. The film has a wide range of applications in food packaging owing to the integration of color development and antibacterial and antioxidative properties.

8 Claims, No Drawings

METHOD FOR PREPARING INTELLIGENT ANTIBACTERIAL AND ANTIOXIDATIVE FILM

CROSS-REFERENCE TO RELATED APPLICATIONS

This application is a continuation of International Patent Application No. PCT/CN2017/093193, filed on Jul. 17, 2017 which claims the benefit of priority from Chinese Application No. 201710301118.1, filed on May 2, 2017. The content of the aforementioned applications, including any intervening amendments thereto, are incorporated herein by reference.

TECHNICAL FIELD

The present invention relates to food packaging materials, and more particularly to a method for preparing an intelligent antibacterial and antioxidative film.

BACKGROUND OF THE PRESENT INVENTION

Nutrition in food is reduced because of food spoilage and deterioration, and shelf life of food is thus shortened. Active packaging technology has been widely applied in recent years. Antibacterial agents or antioxidants are directly added to or coated on plastic films to form the films with antibacterial and antioxidative properties. The films are effective in inhibiting the reproduction and growth of microorganisms by releasing active substances to food during storage, thus protecting food from oxidation and spoilage and prolonging the shelf life of food. However, when food is packaged with films, it is difficult to observe whether the food has spoiled, so that the food cannot be disposed timely. Therefore, there is a need to develop a film which shows a different color when the food begins to spoil.

Purple sweet potato cyanidin (PSPC) is an anthocyanin naturally extracted from root tubers, stems and leaves of purple sweet potato. PSPC, as a desirable natural edible pigment resource with bright color, is free of toxicity and special odor, and plays a role in nutrition, pharmacology and health care, such as antimutation, antioxidation, alleviation of liver dysfunction, anti-hyperglycemia. Moreover, PSPC may change colors under acidic or base environment, indicating red in the case of acid and blue in the case of base.

Nano-$TiO_2$ has been widely used in pharmaceutical, cosmetic, food and packaging applications due to its high stability and self-cleaning, self-sterilization, photocatalyst and antimicrobial properties. Moreover, $TiO_2$ has higher band-gap energy upon irradiation with visible light or ultraviolet light due to its photocatalytic activity, and electron-hole pairs are generated on the surfaces of $TiO_2$ particles. The electron-hole pairs can induce redox reactions to kill bacteria or inhibit the growth of bacteria.

Polyvinyl alcohol (PVA) is a water-soluble polymer which is used in a wide range of applications. PVA possesses strong adhesion, smoothness, gas barrier property, abrasion resistance, and water resistance upon waterproof treatment. In addition, PVA is subjected to a complete biodegradation by microorganisms in nature after it has been used. Therefore, PVA is generally adopted as a base material for packaging with extensive applications in food packaging field. There have been studies on films which are prepared using anthicyanin as a color-developing material. However, there are no reports on preparing an intelligent antibacterial and antioxidative film by combining nano-$TiO_2$ and PSPC with PVA as a base material.

SUMMARY OF THE PRESENT INVENTION

The present invention is to provide a method for preparing an intelligent antibacterial and antioxidative film, including:

1) adding polyvinyl alcohol (PVA) and deionized water at a weight (g)-volume (mL) ratio of 11:100 into a vessel; placing the vessel in a boiler at 121° C. for 40 minutes; transferring the vessel to a mixer at 40° C. and 50 rpm when a boiler temperature is reduced to 90° C.; adding glycerol into the vessel under stirring to produce a PVA solution;

2) adding nano-$TiO_2$ to the PVA solution under stirring and mixing the nano-$TiO_2$ and the PVA solution for 2 hours to produce a blend; and subjecting the blend to ultrasonication for 10 minutes to remove bubbles in the blend so as to produce a PVA-$TiO_2$ solution;

3) dissolving purple sweet potato cyanidin (PSPC) with 5-10 mL of hydrochloric acid under stirring at room temperature and 30 rpm for 4 hours to obtain a PSPC solution; and storing the PSPC solution away from light;

4) placing the PVA-$TiO_2$ solution in a mixer at 40° C. and 50 rpm; adding the PSPC solution to the PVA-$TiO_2$ solution under stirring and mixing the PSPC solution and the PVA-$TiO_2$ solution for 20 minutes to produce a mixture; and subjecting the mixture to ultrasonication for 10 minutes to remove bubbles in the mixture so as to produce a PSPC/$TiO_2$/PVA solution; and 5) casting the PSPC/$TiO_2$/PVA solution onto a plate; drying the plate in an oven at 40° C. for 12 hours to remove solvents; storing the plate in a desiccator with a saturated sodium bromide solution for 48 hours to obtain a film; removing the film from the plate and vacuum sealing the film with a high-barrier bag and then placing the sealed film in the desiccator for use.

In an embodiment, the method further includes a step for determining the optimal amount of nano-$TiO_2$ as follows:

casting the PVA-$TiO_2$ solution onto a plate to air dry at room temperature so as to produce a film; removing the film from the plate and drying the film in a vacuum oven at 37° C. for 5 hours; vacuum sealing the film with a high-barrier bag and then placing the sealed film in a desiccator for use; and determining the optimal amount of nano-$TiO_2$ through mechanical performance and antibacterial property tests.

In an embodiment, the PVA has a degree of polymerization of 1799; and the nano-$TiO_2$ has a particle size of 30 nm.

In an embodiment, the hydrochloric acid in step 3) is at pH 3.

In an embodiment, the mixer is a heat collection-constant temperature type magnetic stirrer.

In an embodiment, a weight (g)-volume (mL) ratio of the nano-$TiO_2$ to the PVA solution in step 2) is 0.5-3:100.

In an embodiment, a weight (g)-volume (mL) ratio of the nano-$TiO_2$ to the PVA solution in step 2) is 1:100.

In an embodiment, a ratio of the PSPC solution to the PVA-$TiO_2$ solution in step 3) is 20-30:100 by volume.

In an embodiment, a ratio of the PSPC solution to the PVA-$TiO_2$ solution in step 3) is 26:100 by volume.

As compared to the prior art, the present invention provides a process of making film which is easy to control and a PVA solution with appropriate fluidity and viscosity.

In the present invention, the impact of the processes for preparing and storing the PSPC solution is negligible for the antioxidative property and color development of the film.

The heat collection-constant temperature type magnetic stirrer used in the present invention allows for the through mixing of PVA and active substances.

The film of the present invention has better mechanical performance than saccharide and protein films. Shelf life of food is thus prolonged thanks to the integration of the antibacterial and antioxidative properties of the film. In addition, the film shows color changes in various pH environments, which enables the observation of rancidification of the packaged food. Specifically, the film is dark red at pH 2. The film exhibits a lighter color as the acidity decreases and becomes pale magenta at pH 7. The film exhibits a darker color as the alkalinity increases and becomes dark blue at pH 11. The film of the present invention are suitable for a wide range of applications in food packaging with color development and antibacterial and antioxidative properties.

DETAILED DESCRIPTION OF THE PRESENT INVENTION

The present invention will be further described below in conjunction with the embodiments to make the processes and features of the present invention clearer.

PVA with a degree of polymerization of 1799 was purchased from Shanghai Jingxi Chemical Co., Ltd. Nano-$TiO_2$ with a particle size of 30 nm was purchased from Shanghai Maite Chemical Co., Ltd (China). Purple sweet potato anthocyanin was purchased from Hebei Runbu Biotechnology Co., Ltd. The method for preparing the film of the present invention is as follows:

(1) Preparation of PVA Solution 22 g of PVA was added in a beaker to which 200 mL of deionized water was then added. The beaker was placed in a counter-pressure boiler under high pressure at 121° C. for 40 minutes. The beaker was transferred to a heat collection-constant temperature type magnetic stirrer at 40° C. when the boiler temperature is reduced to 90° C. 1 mL of glycerol as a plasticizer was then added into the beaker by a pipette under magnetic stirring at 50 rpm in a water bath to obtain the PVA solution.

(2) Preparation of PVA-$TiO_2$ Solution

The PVA solution was placed in the heat collection-constant temperature type magnetic stirrer at 40° C. and 50 rpm. Nano-$TiO_2$ with 0.5-3% of the amount of PVA was added to the PVA solution under magnetic stirring at 50 rpm in a water bath. The nano-$TiO_2$ and the PVA solution were mixed for 2 hours to produce a blend while avoiding the polymerization of nanoparticles. The blend was subjected to ultrasonication for 10 minutes to remove bubbles in the blend. The PVA-$TiO_2$ solution was obtained.

(3) Preparation of $TiO_2$/PVA Film and Determination of Optimal Amount of Nano-$TiO_2$ The PVA-$TiO_2$ solution was cast onto a 30 cm×30 cm glass plate to air dry at room temperature so as to produce a film. The film was removed from the glass plate and dried in a vacuum oven for 5 hours at 37° C. The film was vacuum sealed with a high-barrier bag and then placed in a desiccator for use. The optimal amount of nano-$TiO_2$ was determined through mechanical performance and antibacterial activity tests.

(4) Preparation of PSPC Solution

PSPC was dissolved with 5-10 mL of hydrochloric acid (pH=3) and magnetically stirred at 30 rpm and room temperature for 4 hours to obtain a PSPC solution. The obtained PSPC solution was stored in a conical flask wrapped with aluminum foil away from light. The amount of PSPC was 14-26% of the amount of PVA.

(5) Preparation of PSPC/$TiO_2$/PVA Film

The PVA-$TiO_2$ solution was placed in a heat collection-constant temperature type magnetic stirrer at 40° C. and 50 rpm. The PSPC solution was added to the PVA-$TiO_2$ solution under magnetic stirring at 50 rpm in a water bath. The PSPC solution and the PVA-$TiO_2$ solution were mixed for 20 minutes in the water bath and then subjected to ultrasonication for 10 minutes to remove bubbles in the solution so as to obtain a PSPC-$TiO_2$-PVA solution. The PSPC-$TiO_2$-PVA solution was cast onto a 30 cm×30 cm glass plate and then dried in an oven for 12 hours at 40° C. to remove solvents. The glass plate together with a saturated sodium bromide solution was stored in a desiccator for 48 hours to obtain a film. The film was removed from the glass plate, vacuum sealed with a high-barrier bag and placed in a desiccator for use.

Tests and Measurements

1. Tensile Test

During the test, the film was cut into samples each with a length of about 35 mm and a width of 5 mm. The test was carried out according to GB1040-79 Plastic Tensile Test Method with LRX-PLUS Electronic Material Testing Machine at a speed of 1 mm/s. The tensile strength was calculated by formula (1):

$$Ts = \frac{p}{b+d} \quad (1)$$

where Ts was the tensile strength (MPa); P was the maximum tension (N); b was the width of the film samples (mm); and d was the thickness of the film samples (mm).

2. Color Development Test

The film samples were cut into 1 cm×1 cm squares, and then immersed in a hydrochloric acid solution (pH=2.0-7.0) and a sodium hydroxide solution (pH=8.0-11.0) for 5 minutes, so as to observe the color changes of the film samples.

3. Antioxidative Test:

In the dark environment, 3 mg of DPPH was added into 100 mL of absolute methanol to obtain 75 μmol/L of DPPH-methanol solution. The DPPH-methanol solution was refrigerated at 40° C. for use.

The film samples were cut into 3 cm×3 cm squares and placed in a beaker with 100 mL of distilled water. The beaker was placed in a constant-temperature magnetic stirrer at 25° C. and at 150 r/min. 1 mL of sample solution was added to 4 mL of the DPPH-methanol solution (75 μmol/L). The sample solution and the DPPH-methanol solution were mixed and allowed to stand for 50 minutes away from light. The absorbance at 516 nm was measured by an ultraviolet spectrophotometer after complete scavenging of free radicals. DPPH free radical scavenging rate (%) was expressed by formula (2):

$$DPPH \text{ free radical scavenging rate } (\%) = \left(1 - \frac{A_{sample}}{A_{blank}}\right) \times 100 \quad (2)$$

where $A_{sample}$ was the absorbance of the sample solution; and $A_{blank}$ was the absorbance of the blank control.

4. Antibacterial Test

Preparation of LB culture medium: 1 g of peptone, 0.5 g of yeast extract, 1 g of sodium chloride and 95 mL of distilled water are added to a container. The container was shaken until solutes in the culture medium dissolve. The pH was adjusted to 7.4 with 5 mol/L of NaOH. The culture medium was diluted to 100 mL with distilled water, which was charged in a flask and sterilized at 125° C. for 25 minutes.

Preparation of a potato solid culture medium: 20 g of peeled potato was cut into blocks and then added to 100 mL of distilled water. The potato blocks are boiled for 30 minutes (controlling the heat and adding water when needed). Then, the boiled potato blocks were filtered with gauze to produce a filtrate. 2 g of sucrose and 2 g of agar were added to the filtrate. The filtrate was kept at a natural pH (about 6.0) and diluted to 100 mL with distilled water, which was charged in a flask and sterilized at 125° C. for 25 minutes.

Enrichment culture of *Escherichia coli*: The strain was inoculated to a LB culture medium in a sterile room, and cultured in a full-temperature incubator shaker for 16 hours at 38° C. while shaking at 100 r/min.

Inhibition zone test: The cultured *Escherichia coli* was inoculated to the surface of the sterilized potato solid medium with an inoculating loop and uniformly cast on the surface. The sample film was shaped into several small rounds each with a diameter of 1 cm by a puncher. The small round films are placed on a flat plate and closely adhered onto the culture medium. The culture medium was covered with a lid and cultured in a constant-temperature and humidity incubator at 38° C. for 20 hours. The presence or absence of the inhibition zone was observed and recorded.

Example 1

22 g of PVA was added in a beaker to which 200 mL of deionized water was then added. The beaker was placed in a counter-pressure boiler under high pressure at 121° C. for 40 minutes. The beaker was transferred to a heat collection-constant temperature type magnetic stirrer at 40° C. when the boiler temperature is reduced to 90° C. 1 mL of glycerol as a plasticizer was then added into the beaker by a pipette under magnetic stirring at 50 rpm in a water bath to obtain a PVA solution.

The PVA solution was placed in the heat collection-constant temperature type magnetic stirrer at 40° C. and 50 rpm. Nano-$TiO_2$ with 0.5% of the amount of PVA was then added to the PVA solution under magnetic stirring at 50 rpm in a water bath. The nano-$TiO_2$ and the PVA solution were mixed for 2 hours to produce a blend while avoiding the polymerization of nanoparticles. The blend was subjected to ultrasonication for 10 minutes to remove bubbles in the blend. The PVA-$TiO_2$ solution was obtained.

The PVA-$TiO_2$ solution was cast onto a 30 cm×30 cm glass plate to air dry at room temperature so as to produce a film. The film was removed from the glass plate and dried in a vacuum oven for 5 hours at 37° C. The film was vacuum sealed with a high-barrier bag and then placed in a desiccator for use.

The tensile strength and the antibacterial property of the $TiO_2$/PVA film were measured. Results for tensile strength and antibacterial properties of the film are shown in Tables 1 and 2, respectively.

Example 2

22 g of PVA was added in a beaker to which 200 mL of deionized water was then added. The beaker was placed in a counter-pressure boiler under high pressure at 121° C. for 40 minutes. The beaker was transferred to a heat collection-constant temperature type magnetic stirrer at 40° C. when the boiler temperature is reduced to 90° C. 1 mL of glycerol as a plasticizer was then added into the beaker by a pipette under magnetic stirring at 50 rpm in a water bath to obtain a PVA solution.

The PVA solution was placed in the heat collection-constant temperature type magnetic stirrer at 40° C. and 50 rpm. Nano-$TiO_2$ with 1% of the amount of PVA was then added to the PVA solution under magnetic stirring at 50 rpm in a water bath. The Nano-$TiO_2$ and the PVA solution were mixed for 2 hours to produce a blend while avoiding the polymerization of nanoparticles. The blend was subjected to ultrasonication for 10 minutes to remove bubbles in the blend. The PVA-$TiO_2$ solution was obtained.

The PVA-$TiO_2$ solution was cast onto a 30 cm×30 cm glass plate to air dry at room temperature so as to produce a film. The film was removed from the glass plate and dried in a vacuum oven for 5 hours at 37° C. The film was vacuum sealed with a high-barrier bag and then placed in a desiccator for use.

The tensile strength and the antibacterial property of the $TiO_2$/PVA film were measured. Results for tensile strength and antibacterial properties of the film are shown in Tables 1 and 2, respectively.

Example 3

22 g of PVA was added in a beaker to which 200 mL of deionized water was then added. The beaker was placed in a counter-pressure boiler under high pressure at 121° C. for 40 minutes. The beaker was transferred to a heat collection-constant temperature type magnetic stirrer at 40° C. when the boiler temperature is reduced to 90° C. 1 mL of glycerol as a plasticizer was then added into the beaker by a pipette under magnetic stirring at 50 rpm in a water bath to obtain a PVA solution.

The PVA solution was placed in the heat collection-constant temperature type magnetic stirrer at 40° C. and 50 rpm. Nano-$TiO_2$ with 2% of the amount of PVA was then added to the PVA solution under magnetic stirring at 50 rpm in a water bath. The Nano-$TiO_2$ and the PVA solution were mixed for 2 hours to produce a blend while avoiding the polymerization of nanoparticles. The blend was subjected to ultrasonication for 10 minutes to remove bubbles in the blend. The PVA-$TiO_2$ solution was obtained.

The PVA-$TiO_2$ solution was cast onto a 30 cm×30 cm glass plate to air dry at room temperature so as to produce a film. The film was removed from the glass plate and dried in a vacuum oven for 5 hours at 37° C. The film was vacuum sealed with a high-barrier bag and then placed in a desiccator for use.

The tensile strength and the antibacterial property of the $TiO_2$/PVA film were measured. Results for tensile strength and antibacterial properties of the film are shown in Tables 1 and 2, respectively.

Example 4

22 g of PVA was added in a beaker to which 200 mL of deionized water was then added. The beaker was placed in a counter-pressure boiler under high pressure at 121° C. for 40 minutes. The beaker was transferred to a heat collection-constant temperature type magnetic stirrer at 40° C. when the boiler temperature is reduced to 90° C. 1 mL of glycerol as a plasticizer was then added into the beaker by a pipette under magnetic stirring at 50 rpm in a water bath to obtain a PVA solution.

The PVA solution was placed in the heat collection-constant temperature type magnetic stirrer at 40° C. and 50 rpm. Nano-TiO$_2$ with 3% of the amount of PVA was then added to the PVA solution under magnetic stirring at 50 rpm in a water bath. The Nano-TiO$_2$ and the PVA solution were mixed for 2 hours to produce a blend while avoiding the polymerization of nanoparticles. The blend was subjected to ultrasonication for 10 minutes to remove bubbles in the blend. The PVA-TiO$_2$ solution was obtained.

The PVA-TiO$_2$ solution was cast onto a 30 cm×30 cm glass plate to air dry at room temperature so as to produce a film. The film was removed from the glass plate and dried in a vacuum oven for 5 hours at 37° C. The film was vacuum sealed with a high-barrier bag and then placed in a desiccator for use.

The tensile strength and the antibacterial property of the TiO$_2$/PVA film were measured. Results for tensile strength and antibacterial properties of the film are shown in Tables 1 and 2, respectively.

Example 5

22 g of PVA was added in a beaker to which 200 mL of deionized water was then added. The beaker was placed in a counter-pressure boiler under high pressure at 121° C. for 40 minutes. The beaker was transferred to a heat collection-constant temperature type magnetic stirrer at 40° C. when the boiler temperature is reduced to 90° C. 1 mL of glycerol as a plasticizer was then added into the beaker by a pipette under magnetic stirring at 50 rpm in a water bath to obtain the PVA solution.

The PVA solution was placed in the heat collection-constant temperature type magnetic stirrer at 40° C. and 50 rpm. Nano-TiO$_2$ with 1% of the amount of PVA was then added to the PVA solution under magnetic stirring at 50 rpm in a water bath. The Nano-TiO$_2$ and the PVA solution were mixed for 2 hours to produce a blend while avoiding the polymerization of nanoparticles. The blend was subjected to ultrasonication for 10 minutes to remove bubbles in the blend. The PVA-TiO$_2$ solution was obtained.

PSPC was dissolved with 5.5 mL of hydrochloric acid (pH=3) and magnetically stirred for 4 hours at 30 rpm and at room temperature to obtain a PSPC solution. The obtained PSPC solution was stored in a conical flask wrapped with aluminum foil away from light. The amount of PSPC was 14% of the amount of PVA.

The PVA-TiO$_2$ solution was placed in a heat collection-constant temperature type magnetic stirrer at 40° C. and 50 rpm. The PSPC solution was added to the PVA-TiO$_2$ solution under magnetic stirring at 50 rpm in a water bath. The PSPC solution and the PVA-TiO$_2$ solution were mixed for 20 minutes in the water bath and then subjected to ultrasonication for 10 minutes to remove bubbles in the solution so as to obtain a PSPC-TiO$_2$-PVA solution. The PSPC-TiO$_2$-PVA solution was cast onto a 30 cm×30 cm glass plate and then dried in an oven for 12 hours at 40° C. to remove solvents. The glass plate together with a saturated sodium bromide solution was stored in a desiccator for 48 hours to obtain a film. The film was removed from the glass plate, vacuum sealed with a high-barrier bag, and placed in a desiccator for use.

The color development and the antioxidative property of the PSPC/TiO$_2$/PVA film were measured. Results for color development and the antioxidative properties of the film are shown in Tables 3 and 4, respectively.

Example 6

22 g of PVA was added in a beaker to which 200 mL of deionized water was then added. The beaker was placed in a counter-pressure boiler under high pressure at 121° C. for 40 minutes. The beaker was transferred to a heat collection-constant temperature type magnetic stirrer at 40° C. when the boiler temperature is reduced to 90° C. 1 mL of glycerol as a plasticizer was then added into the beaker by a pipette under magnetic stirring at 50 rpm in a water bath to obtain the PVA solution.

The PVA solution was placed in the heat collection-constant temperature type magnetic stirrer at 40° C. and 50 rpm. Nano-TiO$_2$ with 1% of the amount of PVA was then added to the PVA solution under magnetic stirring at 50 rpm in a water bath. The Nano-TiO$_2$ and the PVA solution were mixed for 2 hours to produce a blend while avoiding the polymerization of nanoparticles. The blend was subjected to ultrasonication for 10 minutes to remove bubbles in the blend. The PVA-TiO$_2$ solution was obtained.

PSPC was dissolved with 6.5 mL of hydrochloric acid (pH=3) and magnetically stirred for 4 hours at 30 rpm and at room temperature to obtain a PSPC solution. The obtained PSPC solution was stored in a conical flask wrapped with aluminum foil away from light. The amount of PSPC was 18% of the amount of PVA.

The PVA-TiO$_2$ solution was placed in a heat collection-constant temperature type magnetic stirrer at 40° C. and 50 rpm. The PSPC solution was added to the PVA-TiO$_2$ solution under magnetic stirring at 50 rpm in a water bath. The PSPC solution and the PVA-TiO$_2$ solution were mixed for 20 minutes in the water bath and then subjected to ultrasonication for 10 minutes to remove bubbles in the solution so as to obtain a PSPC-TiO$_2$-PVA solution. The PSPC-TiO$_2$-PVA solution was cast onto a 30 cm×30 cm glass plate and then dried in an oven for 12 hours at 40° C. to remove solvents. The glass plate together with a saturated sodium bromide solution was stored in a desiccator for 48 hours to obtain a film. The film was removed from the glass plate, vacuum sealed with a high-barrier bag, and placed in a desiccator for use.

The color development and the antioxidative properties of the PSPC/TiO$_2$/PVA film were measured. Results for color development and the antioxidative property of the film are shown in Tables 3 and 4, respectively.

Example 7

22 g of PVA was added in a beaker to which 200 mL of deionized water was then added. The beaker was placed in a counter-pressure boiler under high pressure at 121° C. for 40 minutes. The beaker was transferred to a heat collection-constant temperature type magnetic stirrer at 40° C. when the boiler temperature is reduced to 90° C. 1 mL of glycerol as a plasticizer was then added into the beaker by a pipette under magnetic stirring at 50 rpm in a water bath to obtain the PVA solution.

The PVA solution was placed in the heat collection-constant temperature type magnetic stirrer at 40° C. and 50 rpm. Nano-TiO$_2$ with 1% of the amount of PVA was then added to the PVA solution under magnetic stirring at 50 rpm in a water bath. The Nano-TiO$_2$ and the PVA solution were mixed for 2 hours to produce a blend while avoiding the polymerization of nanoparticles. The blend was subjected to ultrasonication for 10 minutes to remove bubbles in the blend. The PVA-TiO$_2$ solution was obtained.

PSPC was dissolved with 7.5 mL of hydrochloric acid (pH=3) and magnetically stirred for 4 hours at 30 rpm and at room temperature to obtain a PSPC solution. The obtained PSPC solution was stored in a conical flask wrapped with aluminum foil away from light. The amount of PSPC was 22% of the amount of PVA.

The PVA-TiO$_2$ solution was placed in a heat collection-constant temperature type magnetic stirrer at 40° C. and 50 rpm. The PSPC solution was added to the PVA-TiO$_2$ solution under magnetic stirring at 50 rpm in a water bath. The PSPC solution and the PVA-TiO$_2$ solution were mixed for 20 minutes in the water bath and then subjected to ultrasonication for 10 minutes to remove bubbles in the solution so as to obtain a PSPC-TiO$_2$-PVA solution. The PSPC-TiO$_2$-PVA solution was cast onto a 30 cm×30 cm glass plate and then dried in an oven for 12 hours at 40° C. to remove solvents. The glass plate together with a saturated sodium bromide solution was stored in a desiccator for 48 hours to obtain a film. The film was removed from the glass plate, vacuum sealed with a high-barrier bag, and placed in a desiccator for use.

The color development and the antioxidative properties of the PSPC-TiO$_2$-PVA film were measured. Results for color development and the antioxidative property of the film are shown in Tables 3 and 4, respectively.

Example 8

22 g of PVA was added in a beaker to which 200 mL of deionized water was then added. The beaker was placed in a counter-pressure boiler under high pressure at 121° C. for 40 minutes. The beaker was transferred to a heat collection-constant temperature type magnetic stirrer at 40° C. when the boiler temperature is reduced to 90° C. 1 mL of glycerol as a plasticizer was then added into the beaker by a pipette under magnetic stirring at 50 rpm in a water bath to obtain the PVA solution.

The PVA solution was placed in the heat collection-constant temperature type magnetic stirrer at 40° C. and 50 rpm. Nano-TiO$_2$ with 1% of the amount of PVA was then added to the PVA solution under magnetic stirring at 50 rpm in a water bath. The Nano-TiO$_2$ and the PVA solution were mixed for 2 hours to produce a blend while avoiding the polymerization of nanoparticles. The blend was subjected to ultrasonication for 10 minutes to remove bubbles in the blend. The PVA-TiO$_2$ solution was obtained.

PSPC was dissolved with 8.5 mL of hydrochloric acid (pH=3) and magnetically stirred for 4 hours at 30 rpm and at room temperature to obtain a PSPC solution. The obtained PSPC solution was stored in a conical flask wrapped with aluminum foil away from light. The amount of PSPC was 26% of the amount of PVA.

The PVA-TiO$_2$ solution was placed in a heat collection-constant temperature type magnetic stirrer at 40° C. and 50 rpm. The PSPC solution was added to the PVA-TiO$_2$ solution under magnetic stirring at 50 rpm in a water bath. The PSPC solution and the PVA-TiO$_2$ solution were mixed for 20 minutes in the water bath and then subjected to ultrasonication for 10 minutes to remove bubbles in the solution so as to obtain a PSPC-TiO$_2$-PVA solution. The PSPC-TiO$_2$-PVA solution was cast onto a 30 cm×30 cm glass plate and then dried in an oven for 12 hours at 40° C. to remove solvents. The glass plate together with a saturated sodium bromide solution was stored in a desiccator for 48 hours to obtain a film. The film was removed from the glass plate, vacuum sealed with a high-barrier bag, and placed in a desiccator for use.

The color development and the antioxidative property of the PSPC/TiO$_2$/PVA film were measured. Results for color development and the antioxidative property of the film are shown in Tables 3 and 4, respectively.

TABLE 1

Tensile Performance of PVA Films with Different Amounts of Nano-TiO$_2$

| Films | Amount of Nano-TiO$_2$ (g) | Tensile Strength (MPa) |
| --- | --- | --- |
| TiO$_2$/PVA | 0.11 | 28.7 |
| TiO$_2$/PVA | 0.22 | 35.1 |
| TiO$_2$/PVA | 0.44 | 31.4 |
| TiO$_2$/PVA | 0.66 | 29.7 |

TABLE 2

Antibacterial Property of PVA Films with Different Amounts of Nano-TiO$_2$

| Films | Amount of Nano-TiO$_2$ (g) | Presence of Inhibition Rate |
| --- | --- | --- |
| TiO$_2$/PVA | 0.11 | Yes |
| TiO$_2$/PVA | 0.22 | Yes |
| TiO$_2$/PVA | 0.44 | Yes |
| TiO$_2$/PVA | 0.66 | Yes |

TABLE 3

Color Development of TiO$_2$/PVA Films with Different Amounts of PSPC

| | pH | | | | | |
| --- | --- | --- | --- | --- | --- | --- |
| Examples | 2 | 3 | 4-6 | 7 | 8-10 | 11 |
| Example 5 | Dark red | Light red | Light pink | Pale violet red | Blue | Dark blue |
| Example 6 | Dark red | Light red | Light pink | Pale violet red | Blue | Dark blue |
| Example 7 | Dark red | Light red | Light pink | Pale violet red | Blue | Dark blue |
| Example 8 | Dark red | Light red | Light pink | Pale violet red | Blue | Dark blue |

TABLE 4

Antioxidative Property of PVA/nano-TiO$_2$ Films with Different Amounts of PSPC

| Films | Amount of Nano-TiO$_2$ (g) | Amount of PSPC (g) | DPPH free radical scavenging rate (%) |
| --- | --- | --- | --- |
| PSPC/TiO$_2$/PVA | 0.22 | 3.08 | 50.4 |
| PSPC/TiO$_2$/PVA | 0.22 | 3.96 | 61.7 |
| PSPC/TiO$_2$/PVA | 0.22 | 4.84 | 73.2 |
| PSPC/TiO$_2$/PVA | 0.22 | 5.72 | 81.4 |

It can be seen from Table 1 that the tensile strength of the TiO$_2$/PVA film ranges from 28.7-35.1 MPa. The TiO$_2$/PVA film has better mechanical performance compared to saccharide and protein films. Furthermore, the TiO$_2$/PVA film has the optimal mechanical performance when the amount of nano-TiO$_2$ is 1% of the amount of PVA. The presence of inhibition zone through the inhibition zone test, as shown in Table 2, indicates that the film has antibacterial properties. According to Tables 1 and 2, it can be determined that the optimal amount of nano-TiO$_2$ is 1% of the amount of PVA.

It can be known from Table 3 that the PSPC/TiO$_2$/PVA film shows color changes in various pH environments.

Specifically, the film is dark red at pH 2. The film exhibits a lighter color as the acidity decreases, and becomes pale red at pH 3, light pink at pH 4-6 and pale magenta at pH 7. The film exhibits a darker color as the alkalinity increases, and becomes blue at pH 8-10 and dark blue at pH 11.

It can be known from Table 4 that as the amount of purple sweet potato anthocyanin increased, the DPPH free radical scavenging rate increased. The $TiO_2$/PVA film has the strongest antioxidative activity when it contains 26% of purple sweet potato anthocyanin; and however, the $TiO_2$/PVA film has the weakest antioxidant activity when it contains 14% of purple sweet potato anthocyanin. According to evaluation test on DPPH free radical scavenging capability, PSPC is released from the film to display antioxidative activity, thereby functioning to scavenge DPPH free radicals.

It can be concluded from Tables 1-4 that the film shows excellent mechanical performance and antioxidative property with nano-$TiO_2$ of 1% of the amount of PVA and PSPC of 26% of the amount of PVA. The film also has good antibacterial property and shows color changes.

The intelligent antibacterial and antioxidative film of the present invention has better mechanical performance than ordinary films. Furthermore, the shelf life of food may be greatly prolonged and the food rancidification may be monitored intelligently owing to the integration of the color development and antibacterial and antioxidative properties of the film. Therefore, the film has a wide range of applications in food packaging.

The film has better mechanical performance than other saccharide and protein films. The integration of the antibacterial performance and the antioxidative performance of the film can better prolong the shelf life of food. Furthermore, the film can show different colors in different pH environments. Specifically, the film was dark red at pH 2. The color of the film was gradually lightened with the decrease of the acidity. The film was pale violet red at pH 7. And the color of the film was gradually darkened with the increase of the alkalinity, until the film was dark blue at pH 11. Due to the integration of the color developing, antibacterial and antioxidative performance, the film has a wide range of application in the food packaging field.

The film of the present invention has better mechanical performance compared to the saccharide and protein films. Shelf life of food is thus prolonged thanks to the integration of the antibacterial and the antioxidative properties of the film. In addition, the film shows color changes in various pH environments. Specifically, the film is dark red at pH 2. The film exhibits a lighter color as the acidity decreases and becomes pale magenta at pH 7. The film exhibits a darker color as the alkalinity increases and becomes dark blue at pH 11. The film of the present invention are suitable for a wide range of applications in food packaging with combination of color development and antibacterial and antioxidative properties.

What is claimed is:

1. A method for preparing an intelligent antibacterial and antioxidative film, comprising:
    1) adding polyvinyl alcohol (PVA) and deionized water at a weight (g)-volume (mL) ratio of 11:100 into a vessel; placing the vessel in a boiler at 121° C. for 40 minutes; transferring the vessel to a mixer at 40° C. and 50 rpm when a boiler temperature is reduced to 90° C.; adding glycerol into the vessel under stirring to produce a PVA solution;
    2) adding nano-$TiO_2$ into the PVA solution under stirring and mixing the nano-$TiO_2$ and the PVA solution for 2 hours to produce a blend; subjecting the blend to ultrasonication for 10 minutes to remove bubbles in the blend so as to produce a PVA-$TiO_2$ solution;
    3) dissolving purple sweet potato cyanidin (PSPC) with 5-10 mL of hydrochloric acid under stirring at room temperature and 30 rpm for 4 hours to obtain a PSPC solution; and storing the PSPC solution away from light;
    4) placing the PVA-$TiO_2$ solution in a mixer at 40° C. and 50 rpm; adding the PSPC solution to the PVA-$TiO_2$ solution under stirring and mixing the PSPC solution and the PVA-$TiO_2$ solution for 20 minutes to produce a mixture; subjecting the mixture to ultrasonication for 10 minutes to remove bubbles in the mixture so as to produce a PSPC-$TiO_2$-PVA solution; and
    5) casting the PSPC-$TiO_2$-PVA solution onto a plate; drying the plate in an oven at 40° C. for 12 hours to remove solvents; storing the plate in a desiccator with a saturated sodium bromide solution for 48 hours to obtain a film; removing the film from the plate and vacuum sealing the film with a high-barrier bag and then placing the sealed film in the desiccator for use.

2. The method of claim 1, wherein the PVA has a degree of polymerization of 1799.

3. The method of claim 1, wherein the nano-$TiO_2$ has a particle size of 30 nm.

4. The method of claim 1, wherein the hydrochloric acid is at pH 3.

5. The method of claim 1, wherein in step 2) a weight (g)-volume (mL) ratio of the nano-$TiO_2$ to the PVA solution is 0.5-3:100.

6. The method of claim 5, wherein in step 2) a weight (g)-volume (mL) ratio of the nano-$TiO_2$ to the PVA solution is 1:100.

7. The method of claim 1, wherein in step 3) a ratio of the PSPC solution to the PVA-$TiO_2$ solution is 20-30:100 by volume.

8. The method of claim 7, wherein in step 3) a ratio of the PSPC solution to the PVA-$TiO_2$ solution is 26:100 by volume.

* * * * *